E. HOMAN.
GLASS BEVELING MACHINE.
APPLICATION FILED FEB. 9, 1910.
970,227.
Patented Sept. 13, 1910.
2 SHEETS—SHEET 1.
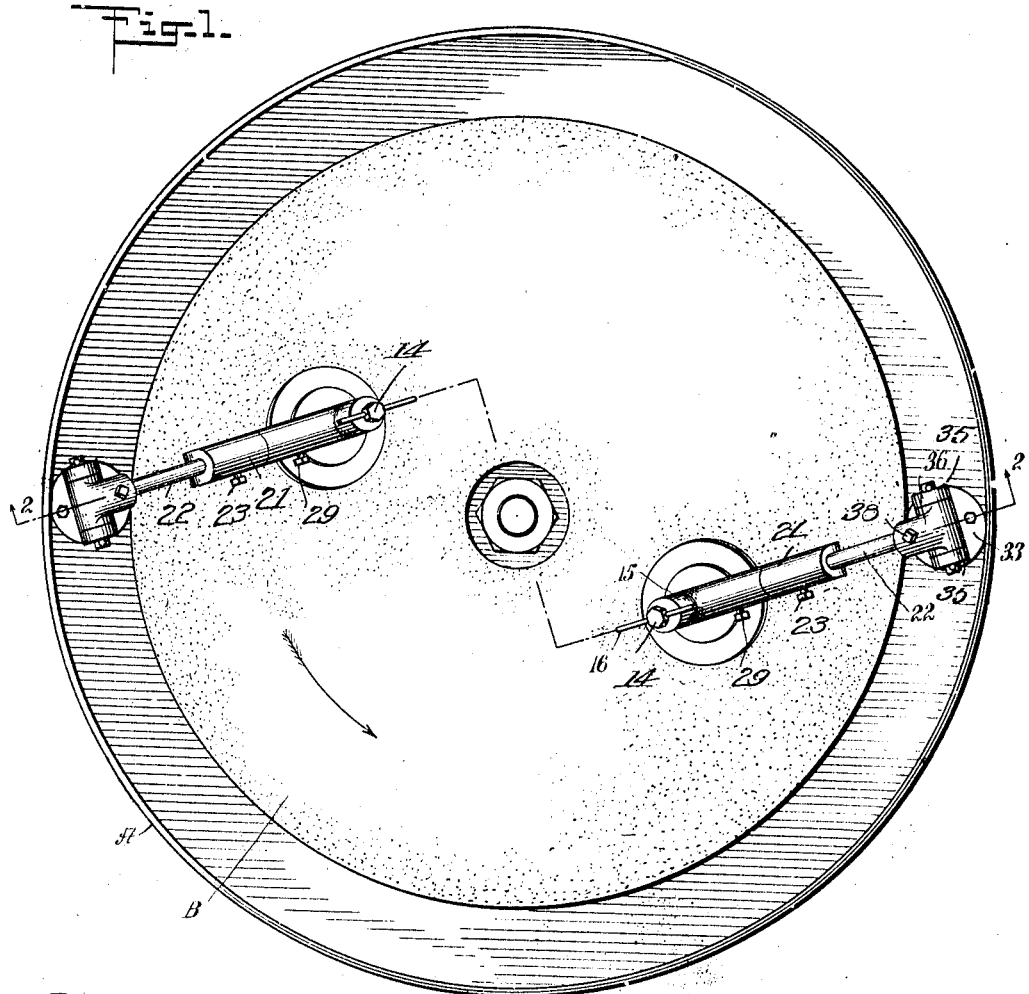
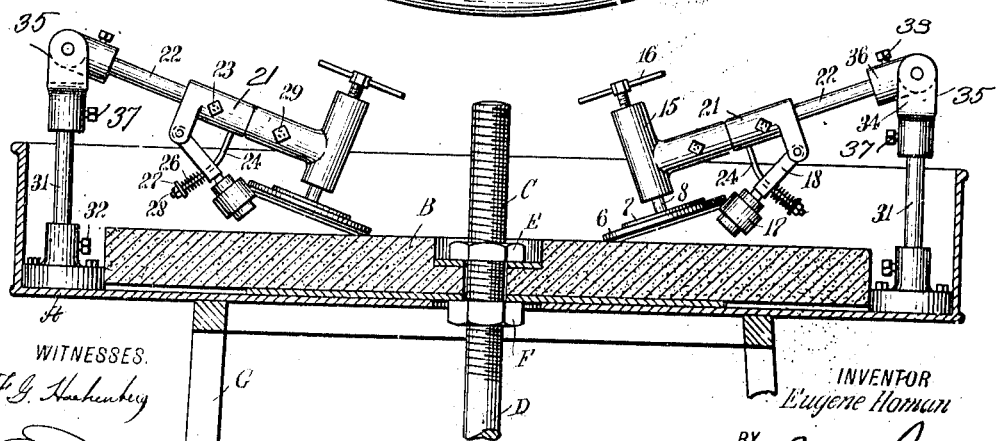
WITNESSES.
INVENTOR
Eugene Homan
BY
ATTORNEYS

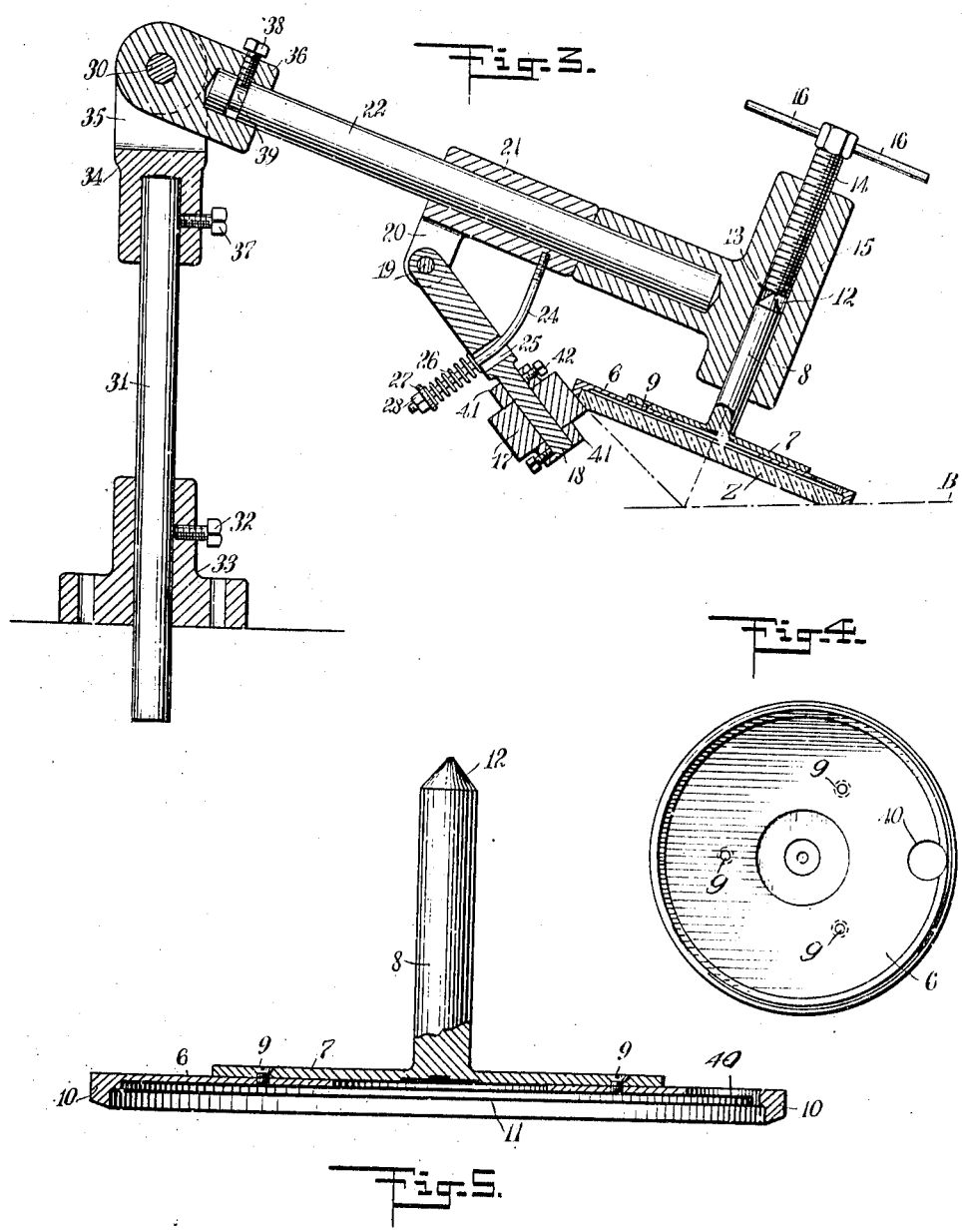

UNITED STATES PATENT OFFICE.

EUGENE HOMAN, OF JERSEY CITY, NEW JERSEY.

GLASS-BEVELING MACHINE.

970,227.  Specification of Letters Patent.  Patented Sept. 13, 1910.

Application filed February 9, 1910. Serial No. 542,856.

*To all whom it may concern:*

Be it known that I, EUGENE HOMAN, a citizen of the United States, and a resident of Jersey City, in the county of Hudson and State of New Jersey, have invented a new and improved Glass-Beveling Machine, of which the following is a full, clear, and exact description.

Among the principal objects which the present invention has in view are: to provide a machine for holding circular glass disks while a bevel is being ground on the edge thereof; to provide a holder for the glass disks which is preserved from scratching or clouding; to provide a holder wherein the disk is revolved about a self-contained center by the drag of the grinding action; to provide means whereby the revolution of the disks about their own centers is regulated and controlled; to provide means whereby disks of the character specified may be rapidly and easily placed in the holding tool; to provide means whereby disks of varying dimensions may be rapidly and readily accommodated; to provide means for quickly adjusting the machine to produce various bevels; to provide means for inspecting the cutting of the glass, not requiring the removal of the glass from the machine; to provide means for amplifying the limits of the size of the said disks; and to provide a machine of the character specified which is simple, efficient and durable in construction and arrangement.

One embodiment of the present invention is disclosed in the structure illustrated in the accompanying drawings, in which like characters of reference denote corresponding parts in all the views, and in which—

Figure 1 is a plan view of a machine constructed and arranged in accordance with the present invention; Fig. 2 is a vertical section taken on the line 2—2 in Fig. 1; Fig. 3 is a detail view in vertical section and on an enlarged scale, of a disk holder constructed and arranged in conformity with the present invention; Fig. 4 is a plan view shown from beneath the disk holder; and Fig. 5 is an enlarged view in detail of the disk holder.

The pan A and the table B are constructed in accordance with any of the well known machines of the present date. The table B is constructed from any suitable material, that shown in the accompanying drawings being illustrated as a suitable grinding stone. This may be substituted by the well known form of cast iron plate adapted to receive a floating coating of sand. The table B, whether constructed from stone or metal, is bolted in position upon the threaded end C of a driving shaft D, and held firmly between clamp nuts E and F. The pan A is perforated to pass the shaft D, and is fixedly mounted upon a standing frame G, as shown in Fig. 2 of the drawings. By any well known means the shaft D, and with it the table B, are rapidly rotated to grind the edge of the disks of glass when brought in contact with the flat upper surface of the table B.

Heretofore various devices for holding disks have been employed, all of which have, in some form or other, involved a lower support for the disk, interposed between the table B and the surface of the said disks. The principal objection urged to this method of holding the glass has been in that the fine grit or sand invariably gains admission between the holder and the glass, resulting in a scratching or clouding of the surface, subsequently requiring that the plate be thoroughly buffed. A further disadvantage in the most popular machines has been that in clamping the glass during the operation, breakage is liable to occur, due to over-stress or to unequal heating.

In the present invention the glass disk is provided with a holder 6. The holder 6, as shown in Figs. 4 and 5, is constructed in the form of a ring, adapted to be secured rigidly to a flange 7 of the spindle 8. In the present drawings the method of securing the flange to the holder is shown as that employing screws 9, 9. Any known method of securing the flange and holder may be employed without departing from the spirit of the present invention. The holder 6 is purposely constructed from light material, so that the same may be discarded when worn away by repeated use. The holder 6 is provided with an annular flange 10 of suitable thickness to give needed support at this point of the construction. The flange is trued on a machine to form a rabbet 11, the horizontal plane of which forms a narrow ledge or seat for the glass disk to rest upon. In practice the ledge of the rabbet 11 is about 1/16 wide. Between the ledge of the rabbet 11 and the back of the body of the holder 6 is a space, as shown more particularly in Fig. 5 of the drawings. This space is sufficiently large to prevent the rolling between the holder 6 and the glass disk of any sand particles which may gain admission to the back of the glass disk during the operation of grinding.

The spindle 8 is of any approved form, preferably being constructed, as shown in Fig. 5, with a conical end thrust bearing 12. The apex of the cone is received in bearing relation by a nipple 13 formed on the end of a screw 14. The screw 14 is threadedly mounted in the head 15 of the holder, and is provided with suitable wing extensions 16, 16 whereby the screw may be turned. By means of this construction, and by setting up the screw 14, the extent of the insertion of the spindle 8 within the head 15 is governed. The spindle 8 and holder 6 have no permanent engagement with the head 15, being supported therein by a roller 17, which extends under the flange 10 at one point of the periphery. As, therefore, the said roller, the spindle 8 and holder 6 have no means for retaining the same within the head 15, by the removal of the roller 17, the holder 6 and spindle 8 may be quickly removed from engagement with the head 15. The roller 17 is yieldingly mounted so that it may be removed from the path of the holder 6, and said holder quickly withdrawn from the head.

The roller 17 is rotatively mounted on a pivot bearing arm 18. The arm 18 is pivoted at 19 between hinge tabs 20 extended from the side of a sleeve 21. The sleeve 21 is slidably mounted on a carrying arm 22, being fixed in position thereon by a set nut 23. Set out from the sleeve 21, and bent to a suitable curve, is a rod 24 which is extended through a perforation 25 formed in the arm 18 and receives a spiral spring 26. The spring 26 is arranged to bear upon the arm 18 on the outer side thereof, to lift the said arm and the roller 17 carried thereby, upward against the holder 6 or glass disk carried thereby. The spring 26 is held in position by a washer 27 and a screw nut 28. The spring 26 is of sufficient length to yield to permit the extension of the arm 18 and roller 17 carried thereby, out of the path of the holder 6, so that the same may be withdrawn from the socket in the head 15. The head 15 is bored to receive the outer end of the arm 22, and is secured thereto by means of a set screw 29.

In practice a glass disk Z, after being rough cut to a circle, is inserted between the depended edges of the flange 12 to rest on the ledge of the rabbet 11. In placing the disk in the support, the arm 22 is easily swung on a pivot pin 30, raising the holder 6 and the head 15 away from the table B. To insert the glass disk the roller 17 is forced away from the holder 6 until the same is seated therein, when the said roller 17 is permitted to bear on the edge of the disk. The operator holding the glass against the holder 6 now depresses the head 15 until the edge of the glass disk is in contact with the table B. In this position the rotation of the table gradually grinds the glass from the sharp or fractured edge to the bevel with which the disk is to be provided.

To set the angle of the bevel a standard 31 is raised or lowered, being held in fixed position by a set screw 32 when the proper angle has been attained. By advancing or retracting the screw 14, the spindle 8 and the holder carried thereby are gradually extended or withdrawn, changing the angle of the arm 22 to the standard 31, the divergence of the said arm regulating to a nicety the bevel to be produced on the glass disk. The standards 31, when adjusted as to height, are fixed by set screws 32, which are mounted in turrets 33, 33 bolted to the pan A. Heads 34 are provided, between the bifurcated extensions 35 whereof are pivoted blocks 36, in which are mounted the arms 22, said blocks being pivoted on the standards 31 at 30, to adjust the angle of the extension of the arms 22 with reference to the rotation of the table B. It is dependent upon the angle at which the arms 22 are set to the table that the speed of revolution of the holders 6 depends. The heads 34, when set, are held by set screws 37. The arms 22 are rotatably held in the blocks 36 by screws 38, the ends whereof are extended into grooves 39 in said arms.

As seen in Fig. 1 of the drawings, the arms 22, 22 carrying the holders 6, are disposed at an angle to the radius of the table B, so as to receive in a thrust the drag of the grinding surface. It is obvious that if the arms 22 should be extended parallel with the radius extending between the center of the table B and the center of the standards 31, the holders 6 and disks carried thereby would be rotated freely by the table B, the periphery of the disks and holders traveling at the same rate as that part of the table with which they contact. The opposite extreme of position would be that wherein the line of extension of the arm 22 is proportioned to the radius of the table at the point of contact of the holder and disk thereon. In this position the portion of the table forming the contact would be moving in a line directly opposed to the extension of the arm 22, resulting in no rotation of the holder 6 and disk connected therewith. By placing the arm 22 at various angles between the two extremes mentioned, a rotation of the holder 6 and disk carried thereby is imparted thereto by the table B, the rapidity of which accords with the position of the said arm. By disposing the arm 22 to produce a slow rotation of the holder and disk, the grinding action is localized and expedited to quicken the process termed roughing. As the bevel is roughed the arm 22 is readjusted to more nearly parallel the radius on which the standard 31 is placed, and the resultant speed of rotation of the holder and disk is accelerated. The acceleration of the rotation of the disk and holder results in a more even distribution of the grinding effect, and produces thereby a more finished edge. If needed, a third adjustment of the holder 6 and disk is that wherein the arm 22 is extended parallel with the said radius. In this position the retardation of the holder and disk is that produced by the slight braking action of the roller 17. The resultant finish of the bevel is such that little is required in subsequent buffing.

A peep hole 40 is formed in the edge of the holder 6, being disposed in such manner that the operator can, by looking through the hole, see the extent to which the operation of grinding is being carried. It will be understood that the disk and holder are raised from the table B when this inspection is made. A slight lift, however, sufficient to prevent the rotation of the disk and holder, is all that would be required.

As above stated, disks of varying diameters are accommodated by the present machine. It will be understood that holders 6 are made to suit each of the many sizes for which beveled glasses of the kind herein mentioned are desired. To accommodate the various holders and disks, the sleeve 21 is adjusted along the arm 22, the set screw 23 being loosened to permit this adjustment. The adjustment of the sleeve 21 moves the roller 17 to accommodate the disks of large or small diameter. At any time, and in all positions, the roller 17 is disposed below the edge of the disk at the highest point from the inclined side of the said disk. The roller 17 is apt to become worn, and for that purpose is held on the arm 18 by collars 41, 41, which are held in position by set screws 42.

Having thus described my invention, what I claim as new and desire to secure by Letters Patent is:—

1. A glass beveling machine comprising a rotary grinding table; a stationary holding frame having an arm extended over said grinding table; means for varying the line of extension of said arm to change the angle thereof with the radii of said table; and a disk holder rotatably mounted in said arm and in a position to incline the body of said holder from the plane of said table.

2. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; and a supporting member extended under the raised edge of said holder and under the disk carried thereby to support the said disk in said holder.

3. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; and a yielding support extended under the raised edge of said holder and the disk carried thereby to support said disk.

4. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; a resilient member carried by said arm; and a rotary member rotatively mounted on said resilient member to extend under the edge of said holder and disk carried thereby.

5. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; a sleeve adjustably mounted on said arm; a rotary member extended from said sleeve and pivotally connected therewith, said member extending below the raised edge of said holder and disk carried thereby; and a spiral spring to support said rotary member in bearing contact with said holder and disk.

6. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; and means for varying the position of said holder on said arm.

7. A glass beveling machine comprising a rotary grinding table; a stationary holding frame having an arm extended over said grinding table; means for varying the line of extension of said arm to change the angle thereof with the radii of said table; a disk holder rotatably mounted in said arm and in a position to incline the body of said holder from the plane of said table; and a thrust bearing for said holder movable in said arm to vary the extension of said holder from said arm.

8. A glass beveling machine comprising a rotary grinding table; a stationary holding frame having an arm extended over said grinding table; means for varying the line of extension of said arm to change the angle thereof with the radii of said table; a bearing head fixedly secured to said arm and at the end thereof, said head having a screw threaded perforation therein; a screw mounted in said perforation to form a thrust bearing therein; and a holder for glass disks having a central spindle adapted to form a bearing in said perforation and against the end of said screw.

9. A glass beveling machine comprising a holder for glass disks having an annular depending flange and a supporting ledge adjacent to said flange and raised from the body of said holder.

In testimony whereof I have signed this specification in the presence of two subscribing witnesses.

EUGENE HOMAN.

Witnesses:
E. F. MURDOCK,
PHILIP D. ROLLHAUS.